United States Patent
Li et al.

(10) Patent No.: US 11,397,493 B2
(45) Date of Patent: Jul. 26, 2022

(54) METHOD FOR TOUCH SENSING ENHANCEMENT IMPLEMENTED IN SINGLE CHIP, SINGLE CHIP CAPABLE OF ACHIEVING TOUCH SENSING ENHANCEMENT, AND COMPUTING APPARATUS

(71) Applicant: NOVATEK MICROELECTRONICS CORP., Hsinchu (TW)

(72) Inventors: Jyun-Sian Li, Zhubei (TW); Yun-Hsiang Yeh, Zhudong Township (TW); Yen-Heng Chen, Zhubei (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 16/884,294

(22) Filed: May 27, 2020

(65) Prior Publication Data

US 2021/0373739 A1 Dec. 2, 2021

(51) Int. Cl.
*G06F 3/045* (2006.01)
*G06F 3/041* (2006.01)
*G06F 3/044* (2006.01)
*G06V 40/13* (2022.01)

(52) U.S. Cl.
CPC .......... *G06F 3/04186* (2019.05); *G06F 3/044* (2013.01); *G06F 3/041661* (2019.05); *G06V 40/1306* (2022.01); *G06F 2203/04104* (2013.01); *G06V 40/13* (2022.01)

(58) Field of Classification Search
CPC .......... G06F 3/04186; G06F 3/041661; G06F 3/044; G06F 2203/04104; G06K 9/0002; G06V 40/13; G06V 40/1306
See application file for complete search history.

(56) References Cited

U.S. PATENT DOCUMENTS

| | | | |
|---|---|---|---|
| 2011/0080358 A1* | 4/2011 | Park | G06F 3/044 345/173 |
| 2014/0270413 A1* | 9/2014 | Slaby | G06F 3/0488 382/124 |
| 2017/0024602 A1* | 1/2017 | Han | G06F 3/0445 |
| 2017/0123555 A1* | 5/2017 | Kim | G06F 3/0445 |
| 2017/0336909 A1* | 11/2017 | Song | G06F 3/0446 |
| 2017/0336910 A1* | 11/2017 | Han | G06F 3/0446 |
| 2018/0089485 A1* | 3/2018 | Bok | G06F 3/044 |

(Continued)

*Primary Examiner* — Adam J Snyder
(74) *Attorney, Agent, or Firm* — Schmeiser, Olsen & Watts, LLP

(57) ABSTRACT

A method for touch sensing enhancement implemented in a single chip, a single chip capable of achieving touch sensing enhancement, and a computing apparatus are introduced. The single chip is used to be coupled to a display panel with a touch sensor and a fingerprint sensor. The computing apparatus may include the display panel, the single chip, and a processing unit, wherein the single chip is coupled between the display panel and processing unit. The method includes obtaining touch sensing data by a touch sensing module disposed within the single chip and coupled to the touch sensor; obtaining fingerprint sensing data by a fingerprint sensing module disposed within the single chip and coupled to the fingerprint sensor; and generating output touch data based on the touch sensing data and the fingerprint sensing data. With the contribution of the fingerprint sensing data, touch sensing enhancement can be achieved.

32 Claims, 13 Drawing Sheets

(56) References Cited

U.S. PATENT DOCUMENTS

| | | | |
|---|---|---|---|
| 2018/0157893 A1* | 6/2018 | Lee | G06F 21/32 |
| 2018/0217698 A1* | 8/2018 | Jung | G06F 3/0446 |
| 2018/0348949 A1* | 12/2018 | Kim | G06F 3/0418 |
| 2019/0278412 A1* | 9/2019 | Byeon | G06F 3/044 |
| 2020/0151415 A1* | 5/2020 | Yuan | G06F 3/044 |
| 2020/0210677 A1* | 7/2020 | Huang | G06F 3/0416 |

* cited by examiner

| 9 | 1 | 7 | 12 | 19 | 20 | 25 | 32 | 22 | 20 | 19 | 12 | 6 | 4 | 0 |
|---|---|---|---|---|---|---|---|---|---|---|---|---|---|---|
| 8 | 1 | 5 | 12 | 22 | 31 | 42 | 43 | 35 | 30 | 23 | 20 | 10 | 6 | 1 |
| 17 | 9 | 16 | 28 | 59 | 120 | 173 | 175 | 136 | 92 | 57 | 35 | 20 | 14 | 6 |
| 20 | 7 | 20 | 59 | 225 | 403 | 449 | 450 | 428 | 374 | 238 | 91 | 44 | 28 | 13 |
| 16 | 11 | 31 | 91 | 368 | 467 | 470 | 473 | 467 | 458 | 436 | 217 | 56 | 32 | 19 |
| 12 | 8 | 27 | 80 | 333 | 461 | 476 | 475 | 474 | 470 | 455 | 242 | 65 | 39 | 19 |
| 9 | 15 | 32 | 53 | 174 | 364 | 476 | 482 | 478 | 466 | 375 | 181 | 66 | 38 | 19 |
| 12 | 18 | 33 | 54 | 91 | 205 | 428 | 429 | 429 | 411 | 210 | 94 | 51 | 39 | 20 |
| 8 | 16 | 28 | 54 | 140 | 358 | 475 | 481 | 470 | 465 | 367 | 180 | 64 | 37 | 18 |
| 5 | 13 | 31 | 63 | 194 | 450 | 477 | 479 | 475 | 463 | 456 | 377 | 114 | 39 | 14 |
| 4 | 13 | 28 | 52 | 132 | 381 | 470 | 470 | 469 | 466 | 460 | 381 | 112 | 40 | 17 |
| 4 | 10 | 25 | 41 | 67 | 176 | 390 | 468 | 460 | 461 | 394 | 199 | 62 | 29 | 14 |
| 2 | 5 | 19 | 31 | 40 | 59 | 125 | 219 | 278 | 240 | 143 | 61 | 32 | 19 | 7 |
| 2 | 2 | 10 | 19 | 26 | 26 | 34 | 51 | 49 | 47 | 36 | 30 | 21 | 15 | 5 |
| 1 | 3 | 9 | 15 | 16 | 14 | 14 | 17 | 15 | 16 | 13 | 12 | 14 | 10 | 6 |

METHOD FOR TOUCH SENSING ENHANCEMENT IMPLEMENTED IN SINGLE CHIP, SINGLE CHIP CAPABLE OF ACHIEVING TOUCH SENSING ENHANCEMENT, AND COMPUTING APPARATUS

BACKGROUND OF THE INVENTION

1. Field of the Invention

The present disclosure relates to a technology for touch sensing enhancement, and in particular to a method for touch sensing enhancement implemented in a single chip, a single chip capable of achieving touch sensing enhancement, and a computing apparatus.

2. Description of the Related Art

For computing devices, such as smart phones, tablet computers or other information processing devices, touch screens have become indispensable components of the computing devices for user interactions. A user can give input or control the computing device through single-touch or multi-touch gestures by touching the touch screen with one or more fingers or a special stylus.

Demand for better touch performance for touch screens continues to increase. The touch performance can be affected by a variety of factors such as the size of sensor pitch, the stability of the common ground, the length of the sensing time, the magnitude of the environmental noise, and the circuit structure of analog front end and so on.

In addition, the touch screens have their own intrinsic limitations so that it is challenging to improve their touch performance. For example, a capacitive touch screen typically has its touch resolution much less than the display resolution of the touch screen. The position of a touch may not be obtained accurately. For multi-touch functions, if two fingers contacting the touch screen are too close to be distinguished, an incorrect touch event may be determined, causing undesirable user experience.

BRIEF SUMMARY OF THE INVENTION

An objective of the present disclosure is to provide a technology for touch sensing enhancement, in which output touch data can be generated based on touch sensing data and fingerprint sensing data. With the contribution of the fingerprint sensing data, touch sensing enhancement can be achieved.

To achieve at least the above objective, the present disclosure provides a method for touch sensing enhancement implemented in a single chip, wherein the single chip is used to be coupled to a display panel with a touch sensor and a fingerprint sensor. The method comprises obtaining touch sensing data by a touch sensing module disposed within the single chip and coupled to the touch sensor; obtaining fingerprint sensing data by a fingerprint sensing module disposed within the single chip and coupled to the fingerprint sensor; and generating output touch data based on the touch sensing data and the fingerprint sensing data.

In an embodiment, the fingerprint sensing data is obtained when the display panel does not show any request for a fingerprint.

In an embodiment, the fingerprint sensing data is obtained and used internally in the single chip for touch sensing enhancement, after user identification recognition is completed (i.e., a user has been authenticated) or which even can be irrelevant to user identification recognition.

In an embodiment, the method further comprises requesting the fingerprint sensing data from the fingerprint sensing module when the touch sensing data indicates a touch event.

In an embodiment, the method further comprises determining that the touch sensing data indicates the touch event when the touch sensing data exceeds a threshold value.

In an embodiment, the step of obtaining the fingerprint sensing data comprises converting the fingerprint sensing data from a first domain corresponding to a fingerprint sensing resolution to a second domain corresponding to a touch sensing resolution.

In an embodiment, the step of obtaining the fingerprint sensing data comprises controlling the fingerprint sensor to have a fingerprint sensing resolution equal to a touch sensing resolution.

In an embodiment, the output touch data includes a position indicating a touch point.

In an embodiment, the position indicating the touch point is determined based on the touch sensing data and the fingerprint sensing data.

In an embodiment, the touch sensing data includes a first position detected by the touch sensor, the fingerprint sensing data includes a second position detected by the fingerprint sensor, and the position indicating the touch point is determined according to the first position and the second position.

In an embodiment, the position indicating the touch point is a weighted averaged position of the first position and the second position.

In an embodiment, the output touch data includes a plurality of positions indicating a plurality of touch points correspondingly.

In an embodiment, the step of generating output touch data based on the touch sensing data and the fingerprint sensing data includes determining a plurality of fingerprint data regions in the fingerprint sensing data according to the fingerprint sensing data; determining a plurality of touch data regions in the touch sensing data according to the fingerprint data regions; and determining the output touch data at least based on at least one of the touch data regions.

In an embodiment, the step of determining the output touch data includes: determining a corresponding position for each one of the touch data regions based on the one of the touch data regions, wherein the output touch data includes the corresponding position for each one of the touch data regions.

To achieve at least the above objective, the present disclosure provides a single chip capable of achieving touch sensing enhancement, wherein the single chip is used to be coupled to a display panel with a touch sensor and a fingerprint sensor. The single chip comprises a touch sensing circuit, a fingerprint sensing module, and a control unit. The touch sensing circuit is utilized for being coupled to the touch sensor and obtaining touch sensing data. The fingerprint sensing module is employed for being coupled to the touch sensor and obtaining fingerprint sensing data. The control unit, coupled to the touch sensing circuit and the fingerprint sensing module, is utilized for generating output touch data based on the touch sensing data and the fingerprint sensing data.

To achieve at least the above objective, the present disclosure further provides a computing apparatus comprising a display panel with a touch sensor and a fingerprint sensor, a processing unit, and a single chip capable of achieving touch sensing enhancement. The single chip capable of achieving touch sensing enhancement is coupled between the display panel and the processing unit. The single chip comprises a touch sensing circuit, a fingerprint sensing module, and a control unit. The touch sensing circuit, coupled to the touch sensor, is utilized for obtaining touch sensing data. The fingerprint sensing module, coupled to the fingerprint sensor, is utilized for obtaining fingerprint sensing data. The control unit, coupled to the touch sensing circuit and the fingerprint sensing module, is utilized for generating output touch data based on the touch sensing data and the fingerprint sensing data.

In some embodiments of the single chip or computing apparatus, the fingerprint sensing data is obtained when a display panel does not show any request for a fingerprint.

In some embodiments of the single chip or computing apparatus, the fingerprint sensing data is obtained and used internally in the single chip for touch sensing enhancement, after user identification recognition is completed (i.e., a user has been authenticated) or which even can be irrelevant to user identification recognition.

In some embodiments of the single chip or computing apparatus, the control unit is configured to request the fingerprint sensing data from the fingerprint sensing module when the touch sensing data indicates a touch event.

In some embodiments of the single chip or computing apparatus, the control unit is configured to determine that the touch sensing data indicates the touch event when the touch sensing data exceeds a threshold value.

In some embodiments of the single chip or computing apparatus, the fingerprint sensing data is converted from a first domain corresponding to a fingerprint sensing resolution to a second domain corresponding to a touch sensing resolution.

In some embodiments of the single chip or computing apparatus, the fingerprint sensor is controlled to have a fingerprint sensing resolution equal to a touch sensing resolution.

In some embodiments of the single chip or computing apparatus, the output touch data includes a position indicating a touch point.

In some embodiments of the single chip or computing apparatus, the control unit is configured to determine the position based on the touch sensing data and the fingerprint sensing data.

In some embodiments of the single chip or computing apparatus, the touch sensing data includes a first position detected by the touch sensor, the fingerprint sensing data includes a second position detected by the fingerprint sensor, and the position indicating the touch point is determined according to the first position and the second position.

In some embodiments of the single chip or computing apparatus, the position indicating the touch point is a weighted averaged position of the first position and the second position.

In some embodiments of the single chip or computing apparatus, the output touch data includes a plurality of positions indicating a plurality of touch points correspondingly.

In some embodiments of the single chip or computing apparatus, the control unit is configured to determine a plurality of touch data regions in the touch sensing data according to the fingerprint sensing data, and determines the output touch data at least based on the touch data regions.

In some embodiments of the single chip or computing apparatus, the control unit is configured to determine a position at least based on a corresponding one of the touch data regions, wherein the output touch data includes the position.

In some embodiments of the single chip or computing apparatus, the control unit is configured to determine a plurality of fingerprint data regions in the fingerprint sensing data according to the fingerprint sensing data; the control unit is configured to determine a plurality of touch data regions in the touch sensing data according to the fingerprint data regions; and the control unit is configured to determine the output touch data based on the touch data regions.

In some embodiments of the single chip or computing apparatus, the control unit is configured to determine a corresponding position for each one of the touch data regions at least based on the one of the touch data regions, wherein the output touch data includes the corresponding position for each one of the touch data regions.

BRIEF DESCRIPTION OF THE DRAWINGS

FIG. 4 is a schematic diagram illustrating an example of fingerprint sensing data.

FIG. 12 is a schematic diagram illustrating an example of determination of fingerprint data regions in the fingerprint sensing data.

DETAILED DESCRIPTION OF THE INVENTION

To facilitate understanding of the object, characteristics and effects of this present disclosure, embodiments together with the attached drawings for the detailed description of the present disclosure are provided.

The following provides various embodiments for the technology for touch sensing enhancement, in which output touch data is capable of being generated based on touch sensing data and fingerprint sensing data. The touch sensing can be enhanced with the contribution of the fingerprint sensing data.

For the sake of illustration, in the following embodiments of a single chip capable of achieving touch sensing enhancement and a computing apparatus employing the single chip are introduced firstly. Then, provided are embodiments of a method for touch sensing enhancement implemented in the single chip.

Figure 1:
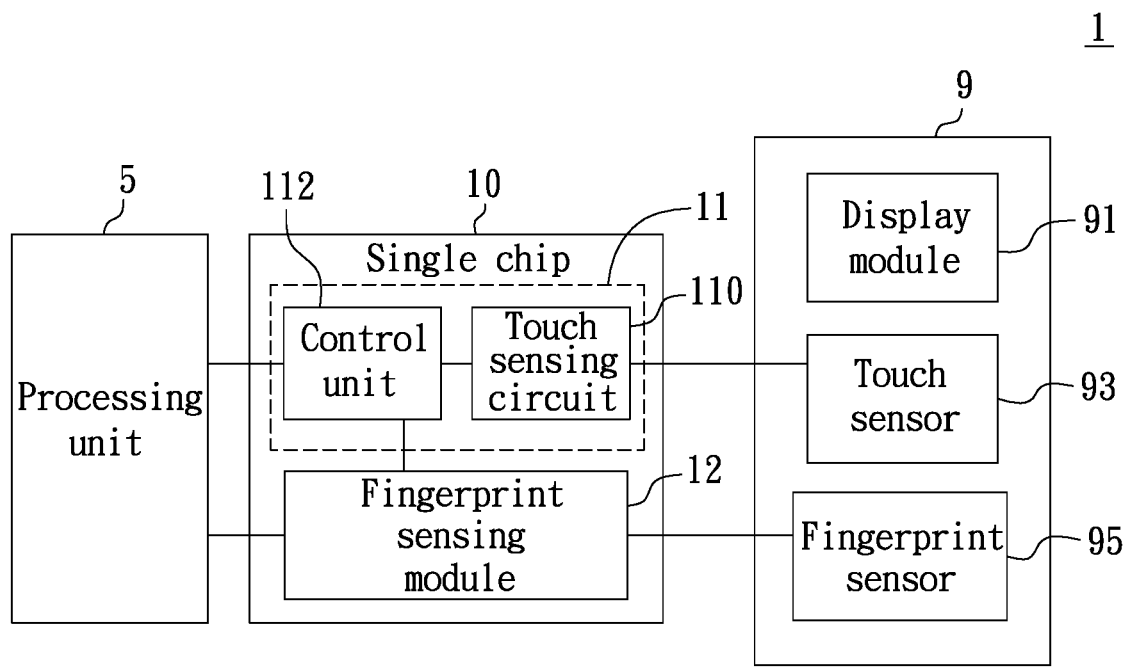
FIG. 1 is a block diagram illustrating a single chip capable of achieving touch sensing enhancement according to an embodiment of the invention, employed in a computing device.

Referring to FIG. 1, a single chip 10 capable of achieving touch sensing enhancement is illustrated, which can be employed in a computing device 1, according to an embodiment of the invention in block diagram form. As shown in FIG. 1, the computing device 1 includes a processing unit 5, a display panel 9, and a single chip 10. The single chip 10 capable of achieving touch sensing enhancement can be utilized for being coupled between the display panel 9 and the processing unit 5. As will be exemplified later, the single chip 10 can be configured to perform a method for touch sensing enhancement illustrated in FIG. 5, in which the single chip 10 is capable of generating output touch data based on touch sensing data and fingerprint sensing data, thus enhancing the touch sensing with the contribution of the fingerprint sensing data.

Based on the structure of computing device 1 illustrated in FIG. 1, any electronic device such as a smart phone, tablet computer or any other information processing device can be realized, wherein the computing device 1 may further include, but not limited to, additional components such as memory, circuits for wireless or wired communication, image capturing or so on, whenever appropriate.

The processing unit 5 is capable of being configured to control the display panel 9 to provide specific functionality. For example, the processing unit 5 executes an application program under an operating system to control the display panel 9 through the single chip 10 so that the computing device 1 can interact with a user through the display panel 9.

The display panel 9 includes a display module 91, such as a liquid crystal display (LCD) module, organic light emitting diode (OLED) module, or so on, and is provided with a touch sensor 93 and a fingerprint sensor 95. The display panel 9, for example, can be implemented by an in-cell type or on-cell type touch display panel integrated with fingerprint sensing, wherein the display panel 9, the touch sensor 93, and the fingerprint sensor 95 are integrated in a layered manner or any appropriate manner. The touch sensor 93 may be implemented by using a capacitive touch sensor 93 in a form of touch sensing array. The fingerprint sensor 95, for example, can be implemented by an optical fingerprint sensor, capacitive fingerprint sensor, ultrasonic fingerprint sensor, or any device for sensing fingerprint signals. In some embodiments, the fingerprint sensor 95 may be implemented to detect at least one portion of the viewable area of image displaying by the display panel 91. In a preferred embodiment, the fingerprint sensor 95 is a full-screen fingerprint sensor, which can cover a same area substantially for image displaying of the display module 91 and for touch sensing of the touch sensor 93. Certainly, the implementation of the invention is not limited to the above examples.

The single chip 10 capable of achieving touch sensing enhancement can be utilized to be coupled to the display panel 9 with the touch sensor 93 and the fingerprint sensor 95. In FIG. 1, the single chip 10 can include a touch sensing circuit 110, a fingerprint sensing module 12, and a control unit 112. In an embodiment, the control unit 112 and the touch sensing circuit 110 may be implemented or viewed as a touch sensing module 11. From the viewpoint of the processing unit 5, the single chip 10 may serve as a "bridge" between the display panel 9 and the processing unit 5. The processing unit 5 may be configured to control the single chip 10 so as to obtain output touch data and/or output fingerprint data. It is noted although a single chip is illustrated in the embodiment, in other implementations, multiple chips can be implemented according to design requirements. For example, in some embodiments, the touch sensing module and the fingerprint sensing module can be implemented as different chips.

The touch sensing circuit 110 can be utilized for being coupled to the touch sensor 93 and obtaining touch sensing data. For example, the touch sensing circuit 110 may include a touch analog front end (AFE) circuit for converting analog touch signals received from the touch sensor 93 into corresponding digital touch data, such as a set of raw touch data associated with and distributed over an area on the screen of the display panel 9 where at least one touch is detected. The touch sensing data can be further obtained based on the digital touch data, for example, by the control unit 112.

The fingerprint sensing module 12 can be utilized for being coupled to the fingerprint sensor 95 and obtaining fingerprint sensing data. For example, the fingerprint sensing module 12 may be implemented for converting fingerprint signals received from the fingerprint sensor 95 into corresponding digital fingerprint data, such as a set of raw fingerprint data associated with and distributed over an area on the screen of the display panel 9 where a fingerprint (or a portion of a fingerprint) is detected. The fingerprint sensing data can be further obtained based on the digital fingerprint data, for example, by the fingerprint sensing module 12 or the control unit 112.

The control unit 112 can be coupled to the touch sensing circuit 110 and the fingerprint sensing module 12. In an example, the control unit 112 can obtain the touch sensing data based on the digital touch data outputted by the touch sensing circuit 110.

Figure 2:
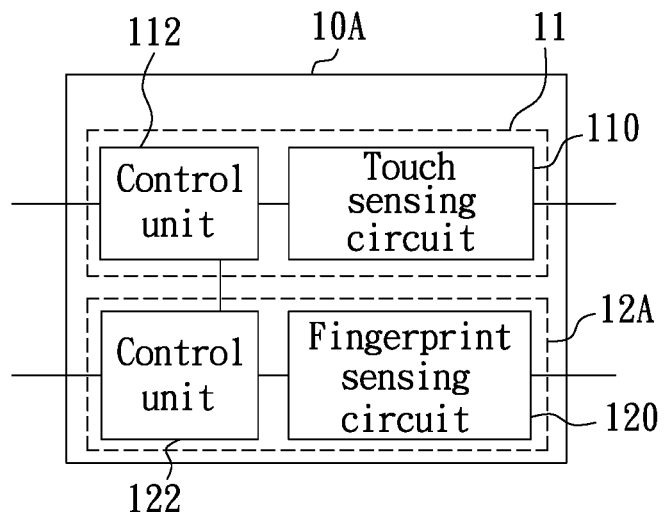
FIG. 2 is a block diagram illustrating a single chip capable of achieving touch sensing enhancement according to another embodiment of the invention.

Referring to FIG. 2, another embodiment of a single chip capable of achieving touch sensing enhancement is illustrated in block diagram form. As shown in FIG. 2, a single chip 10A, as an embodiment based on the single chip 10 in FIG. 1, includes a touch sensing module 11 and a fingerprint sensing module 12A. The fingerprint sensing module 12A may include a fingerprint sensing circuit 120 and a control unit 122 for fingerprint sensing.

For example, the fingerprint sensing circuit 120 may include a fingerprint analog front end (AFE) circuit for converting fingerprint signals received from the fingerprint sensor 95 into corresponding digital fingerprint data, such as a set of raw fingerprint data associated with and distributed over an area where a fingerprint (or a portion of a fingerprint) is detected. The fingerprint sensing data can be further obtained based on the digital fingerprint data, for example, by the control unit 122.

The control unit 122, coupled to the fingerprint sensing circuit 120 and the touch sensing module 11, can be utilized for fingerprint sensing, for example, to generate fingerprint sensing data based on the digital fingerprint data.

In the above examples, the touch sensing circuit 110 or fingerprint sensing circuit 120 may include an analog front end circuit implemented by circuit components such as a low-noise amplifier, an analog-to-digital converter. In the above examples, the control unit 112 or 122 may be complemented by using a processor, microcontroller, or programmable circuit such as field-programmable gate array (FPGA) or application specific integrated circuit (ASIC). In an example, the control units 112 and 122 can be implemented by using a single control unit. Certainly, the implementation of the invention is not limited to the above examples.

Figure 3:
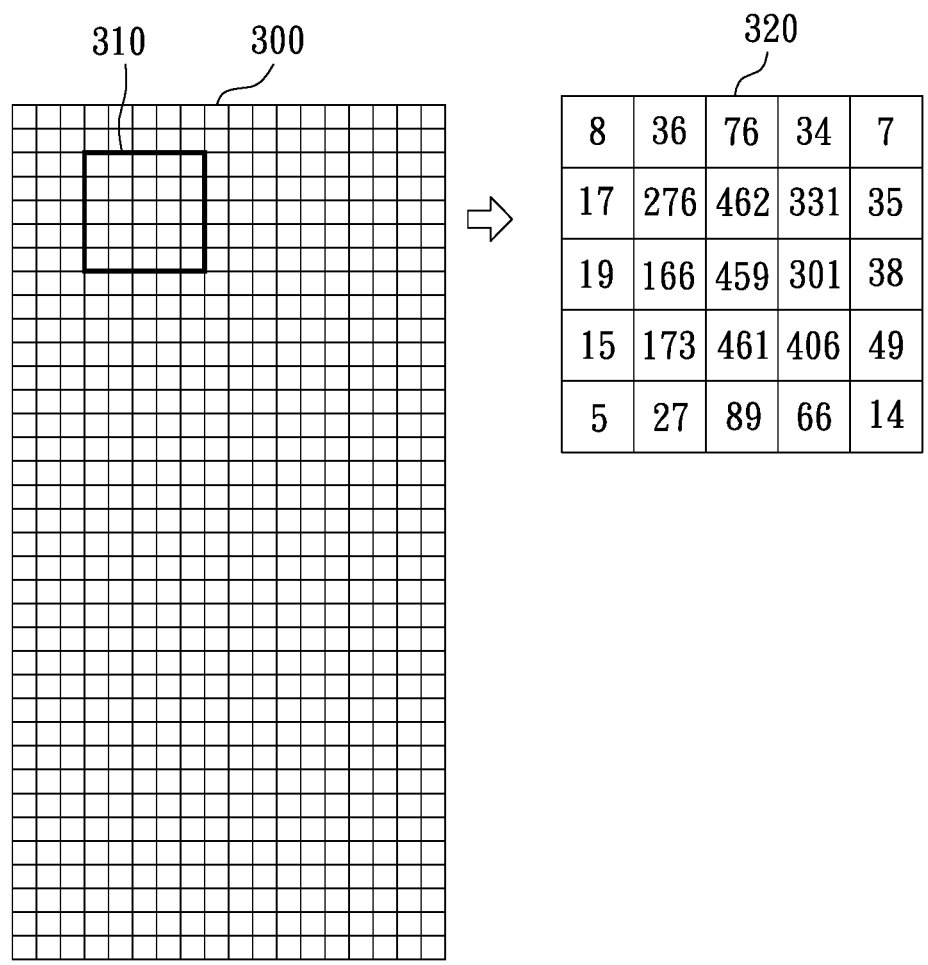
FIG. 3 is a schematic diagram illustrating an example of touch sensing data.

Referring to FIG. 3, an example of touch sensing data is illustrated in schematic form. As shown in FIG. 3, the display panel 9 has a screen area 300 within which a plurality of small blocks are illustrated schematically to indicate an array of touch sensing elements of the touch sensor 93 corresponding to the touch sensing resolution (e.g., 18×36). When a touch is detected on the screen area 300, an area 310 (e.g., 5×5) within the screen area 300 can be determined and represented by using the touch sensing data that may include a plurality of touch sensing values associated with positions in the area 310. As shown in FIG. 3, a block 320 illustrates an enlarged version of the area 310, indicating the touch sensing values associated with positions in the area 310. In addition, in FIG. 3 or other relevant Figures, the sensing values within the block 320 (or other block) are shown for the sake of illustration only; the greater the sensing value (e.g., touch sensing or fingerprint sensing value) is, the greater the detected magnitude (e.g., touch or fingerprint) is. Certainly, the implementation of the invention is not limited to the examples.

The area 310 (e.g., 5×5) within the screen area 300 of FIG. 3 can also be associated with the fingerprint sensing data, as indicated by a block 410 in FIG. 4, for example. As shown in FIG. 4, the block 410 illustrates the fingerprint sensing data that may include a plurality of fingerprint sensing values which are associated with positions in the area 310 of FIG. 3, for example, in different resolution. In the example of FIGS. 3 and 4, with respect to the area 310, the touch sensing data of A1 by A2 (e.g., 5×5) is associated with the fingerprint sensing data of B1 by B2 (e.g., 15×15), wherein A1 and A2 indicate the same or different numbers; B1 and B2 indicate the same or different numbers. The fingerprint sensing resolution may be greater than or equal to the touch sensing resolution. In addition, for the sake of illustration only, some fingerprint sensing values with relatively greater values are shown with an imaginary boundary in bold within the block 410 to indicate that the fingerprint sensing values within the imaginary boundary may correspond to a touch point. Certainly, the implementation of the invention is not limited to the examples.

Figure 5:
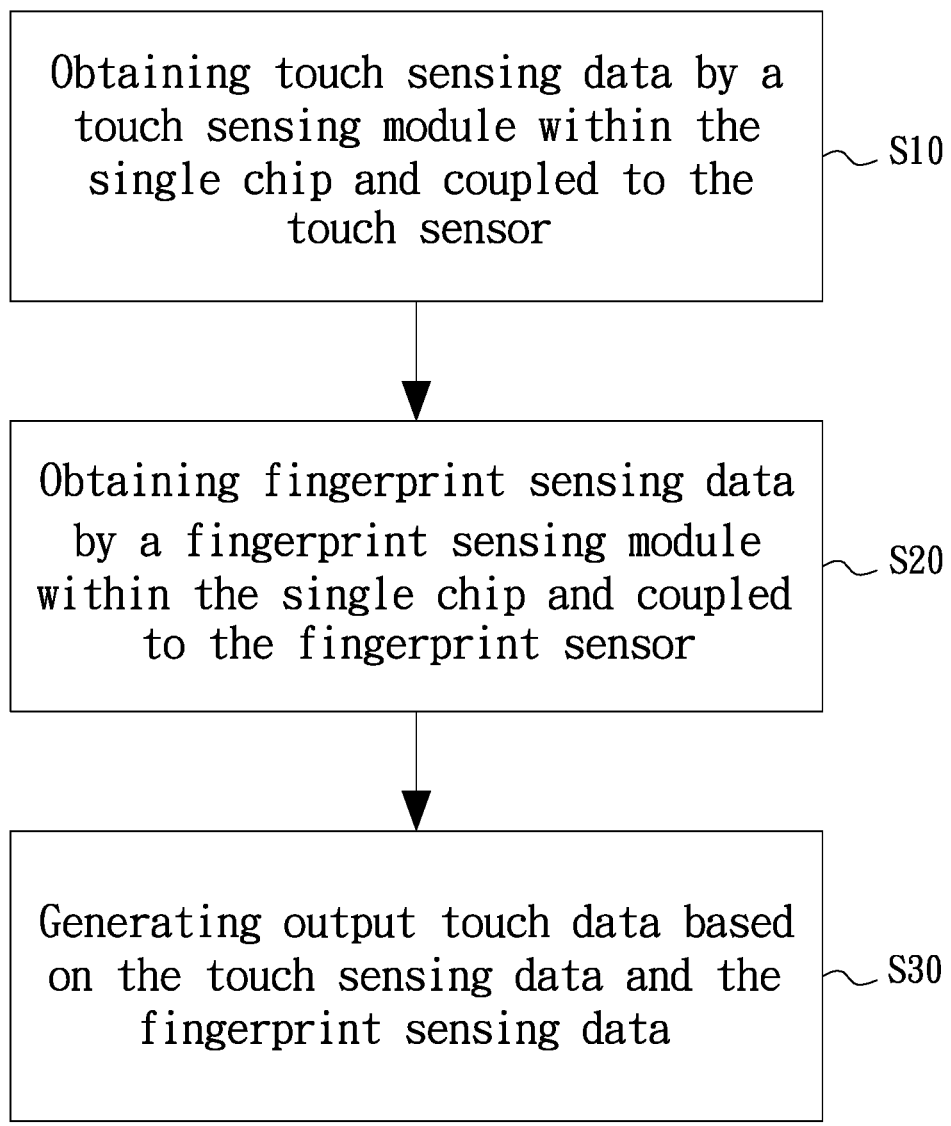
FIG. 5 is a flowchart illustrating a method for touch sensing enhancement implemented in a single chip according to an embodiment of the invention.

Referring to FIG. 5, a method for touch sensing enhancement is illustrated according to an embodiment in flowchart form. The method for touch sensing enhancement is implemented in a single chip, such as the single chip 10 or 10A exemplified above, which is used to be coupled to a display panel 9 with a touch sensor 93 and a fingerprint sensor 95. As shown in FIG. 5, the method includes the following steps.

As indicated by step S10, touch sensing data is obtained by a touch sensing module 11 disposed within the single chip 10 and coupled to the touch sensor 93. The touch sensing data is illustrated in FIG. 3, for example.

As indicated by step S20, fingerprint sensing data is obtained by a fingerprint sensing module 12 disposed within the single chip 10 and coupled to the fingerprint sensor 95. The fingerprint sensing data is illustrated in FIG. 4, for example.

As indicated by step S30, output touch data is generated based on the touch sensing data and the fingerprint sensing data. The step S30 can be performed by the control unit 112, for example.

As such, touch sensing enhancement can be achieved with the contribution of the fingerprint sensing data. For example, if the output touch data includes a position, such as coordinates, indicating a touch point, the coordinates can be obtained more accurately with the contribution of the fingerprint sensing data as in step S30. In another example for multi-touch operations, if the output touch data includes a plurality of positions, such as coordinates, indicating a plurality of touch points correspondingly, the touch points can be distinguished more accurately with the contribution of the fingerprint sensing data as in step S30.

In an embodiment, the fingerprint sensing data is obtained in step S20 when the display panel 9 does not show any request for a user to input a fingerprint. For example, step S20 is performed because the touch sensing enhancement is required in the single chip 10 or 10A internally and hence the processing unit 5 does not control the display panel 9 to show any request message for a user to input a fingerprint.

In an embodiment, the obtaining of the fingerprint sensing data is performed after user identification recognition is completed (i.e., a user has been authenticated) or which even can be irrelevant to user identification recognition. In other words, the fingerprint sensing data can be used to contribute to generating touch data and may enhance the accuracy of the touch data. For example, the fingerprint sensing data obtained in step S20 can be used in step S30 for touch sensing enhancement implemented in the single chip 10 or 10A internally while the processing unit 5 does not require the single chip 10 or 10A to provide output fingerprint data for user identification recognition. This may occur after the computing device 1 has been unlocked such that a user is authorized to operate the computing device 1.

In some embodiments of the method of FIG. 5, step S20 is performed only when at least one criterion is satisfied. In one of the embodiments, the method further includes requesting the fingerprint sensing data from the fingerprint sensing module 12 when the touch sensing data indicates a touch event. For example, the control unit 112 can send a request to the fingerprint sensing module 12 for the fingerprint sensing data when the touch sensing data indicates a touch event. Conversely, when the touch sensing data does not indicate a touch event, the control unit 112 cannot send the request to the fingerprint sensing module 12. In this manner, the fingerprint sensing data can be utilized to enhance the generation of output touch data, more efficiently and effectively. In some embodiments, the method further includes determining that the touch sensing data indicates the touch event when the touch sensing data exceeds a threshold value. For example, it is supposed that the touch sensing data indicates a plurality of touch sensing values associated with positions in an area where a touch is detected (e.g., area 310 of FIG. 3), the touch sensing data can be represented by an average of the touch sensing values and the control unit 112 can determine that the touch sensing data indicates the touch event when the average of the touch sensing values exceeds a corresponding threshold value. In another example, the control unit 112 can determine that the touch sensing data indicates a touch event when one or more of the touch sensing values exceeds a threshold value.

Figure 6A:
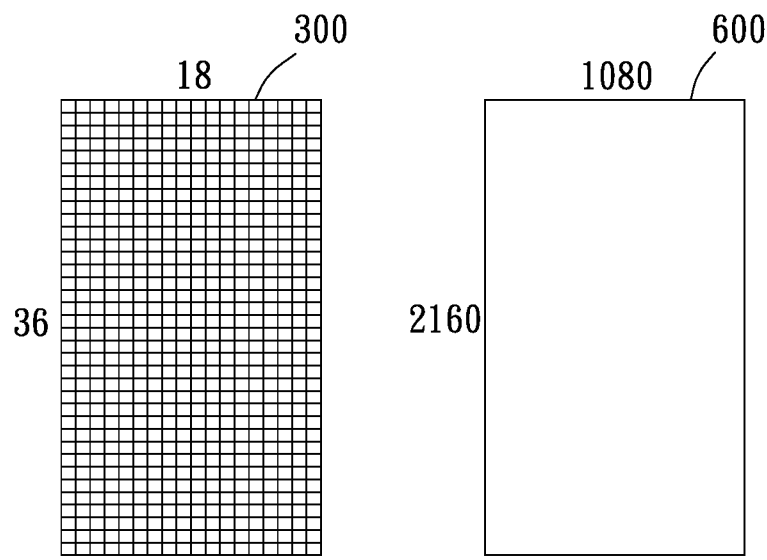
FIG. 6A is a schematic diagram illustrating an example of a fingerprint sensing resolution greater than a touch sensing resolution.
Figure 6B:
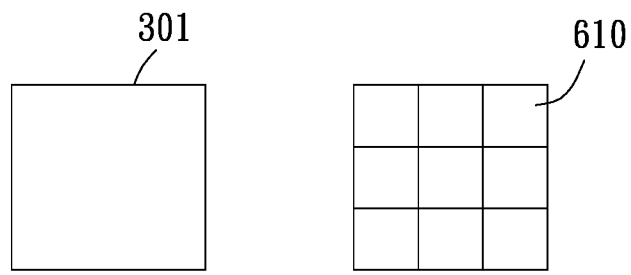
FIG. 6B is a schematic diagram illustrating an example of association between a touch data node and a plurality of fingerprint data nodes in accordance with the example of FIG. 6A.

In some embodiments, the fingerprint sensing resolution is greater than the touch sensing resolution. The fingerprint sensing resolution can be adjusted to match the touch sensing resolution, by hardware (for example, by adjusting the operation of the fingerprint sensor) or by software (for example, by processing the fingerprint sensing data). For example, in the example of FIGS. 3 and 4, with respect to the area 310, the touch sensing data of A1 by A2 (e.g., 5×5) is associated with the fingerprint sensing data of B1 by B2 (e.g., 15×15). Referring to FIG. 6A, in an example, the fingerprint sensing resolution of 1080×2160, indicated by a block 600, is greater than the touch sensing resolution of 18×36, indicated by a block 300. Any one of the positions of touch sensing in the block 300 may be associated with at most 60×60 corresponding positions of fingerprint sensing in the block 600. In order to reduce the complexity of association between a touch sensing position and fingerprint sensing positions, a grouping technique may be employed. Referring to FIG. 6B, an example of association between a touch data node (e.g., indicated by a block 301) and a plurality of fingerprint data nodes (e.g., indicated by 3×3 blocks 610) is illustrated in accordance with the example of FIG. 6A. In FIG. 6B, each fingerprint data node, indicated by block 610, is associated with a plurality of fingerprint sensing elements (e.g., 20×20). In other words, a plurality of fingerprint sensing elements (e.g., 20×20) or positions can be grouped as a fingerprint data node associated with a touch data node (or touch sensing element) or position. In this manner, simplification of signal or data processing and fast processing speed can be achieved.

In one of the embodiments, the step S20 of obtaining the fingerprint sensing data includes converting the fingerprint sensing data from a first domain corresponding to a fingerprint sensing resolution to a second domain corresponding to a touch sensing resolution (e.g., block 300 of 18×36). Taken the above examples in FIGS. 6A and 6B, an example of the first domain corresponding to a fingerprint sensing resolution is shown in the block 600 of resolution of 1080×2160 in FIG. 6A, and the second domain is a fingerprint sensing resolution of 54×108 corresponding to the touch sensing resolution as shown in the block 300 of 18×36 by downscaling the resolution of the block 600 in terms of 20×20 fingerprint sensing elements as a fingerprint data node, indicated by the block 610 in FIG. 6B. In this manner, simplification of signal or data processing can be achieved while the accuracy can be enhanced with the contribution of the fingerprint sensing data in a relative higher resolution, even though being downscaled.

In an embodiment, the step of obtaining the fingerprint sensing data includes controlling the fingerprint sensor 95 to have a fingerprint sensing resolution equal to a touch sensing resolution. For example, the fingerprint sensor 95 is supposed to have adjustable resolution function and the control unit 112 may send a control signal to the fingerprint sensing module 12 to control the fingerprint sensor 95 to have a fingerprint sensing resolution equal to a touch sensing resolution.

In another embodiment, the fingerprint sensor 95 can have a lower fingerprint sensing resolution. For example, the fingerprint sensing elements can be divided into a plurality of groups (e.g., N×M elements for a group, where N and M may be equal or different numbers), and each group is connected to a corresponding analog front end circuit in the fingerprint sensing module 12 or 12A so as to lower the fingerprint sensing resolution, and thus faster processing or power saving can be achieved.

In an embodiment of step S20, the fingerprint sensing module 12 or the fingerprint sensing circuit 120 may include a plurality of analog front end circuits, each of which can be configured to be coupled to a plurality of fingerprint sensing elements of the fingerprint sensor 95 so as to obtain a fingerprint signal.

In the following, embodiments of the method for touch sensing enhancement implemented in a single chip 10 are provided for enhancing accuracy of determining one or more touch points.

In a scenario of a computing device 1 such as a smart phone being not held by human's hand, the signal-to-noise ratio (SNR) may reduce due to no common ground for the smart phone in contrast to the situation of the smart phone being held. In particular, if the display panel 9 is a capacitive touch display panel 9 and the single chip 10 is configured to generate a position of a touch point, the coordinates of the touch point derived from signals from the touch sensor 93 (or detected by the touch sensor 93) may be sensitive to or affected by noise, leading to inaccuracy or jitter of the touch point. Accordingly, in the following embodiments, the position of the touch point is generated based on the touch sensing data and the fingerprint sensing data so as to enhance the accuracy of the position with the contribution of the fingerprint sensing data.

In some embodiments, the output touch data includes a position indicating a touch point. In one of the embodiments, the position indicating the touch point is determined based on the touch sensing data and the fingerprint sensing data.

In another one of the embodiments, the touch sensing data includes a first position detected by, or derived from signals from, the touch sensor 93, the fingerprint sensing data includes a second position detected by, or derived from signals from, the fingerprint sensor 95, and the position indicating the touch point is determined according to the first position and the second position. Alternatively, in one of the embodiments, in step S30 of the method of FIG. 5, a first position detected by, or derived from signals from, the touch sensor 93 is determined based on the touch sensing data, a second position detected by, or derived from signals from, the fingerprint sensor 95 is determined based on the fingerprint sensing data, and the position indicating the touch point is determined according to the first position and the second position. Examples regarding implementation of the embodiments are provided below.

Figure 7:
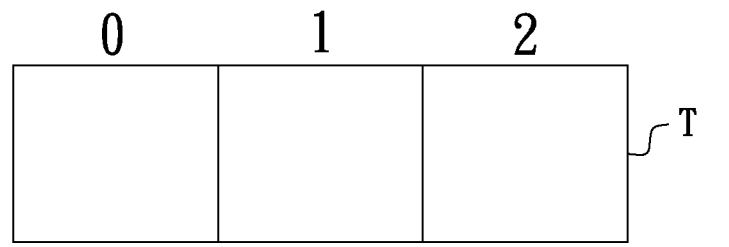
FIG. 7 is a schematic diagram illustrating an example of determination of a representative point based on the touch sensing data and the fingerprint sensing data.

For example, the first position, second position can be determined by way of calculation of a representative point, such as a centroid or center of mass of a set of data. For the sake of illustrating the calculation of a centroid of a data set, referring to FIG. 7, it is supposed an image 701 as a data set is on an area 700 with a coordinates system of Index_X and Index_Y as illustrated. The coordinates of a centroid (or center of mass) of the image 701, denoted by P=(X,Y), can be defined by the following equation (1):

$$P=(X,Y)=(\text{Numerator\_}X/\text{Denominator}, \text{Numerator\_}Y/\text{Denominator}), \quad \text{Eq. (1)}$$

wherein D(x,y) represents a gray level value associated with the coordinates (x,y) of one of the pixels of the image 701,
Denominator=$\Sigma$D(x,y), i.e., a summation of D(x,y) for all pixels of the image 701;
Numerator_X=Index_X*D(x,y); and
Numerator_Y=Index_Y*D(x,y).
Regarding the image 701 in FIG. 7, for example, it is determined that:
Denominator=D(2,2)+D(3,2)+D(4,2)+ . . . +D(5,5);
Numerator_X=2*D(2,2)+3*D(3,2)+4*D(4,2)+ . . . +5*D(5,5); and
Numerator_Y=2*D(2,2)+2*D(3,2)+2*D(4,2)+ . . . +5*D(5,5).

With respect to the touch sensing data derived from signals detected by the touch sensor 93, the touch sensing values (e.g., indicated by the block 320 of FIG. 3) can be viewed as an image and the coordinates of a representative point of the touch sensing values can be determined by the equation (1) in a similar manner. Hence, the coordinates of the representative point of the touch sensing values obtained by using equation (1), denoted by Pt=(Xt, Yt), can be treated as a first position detected by the touch sensor 93.

With respect to the fingerprint sensing data derived from signals detected by the fingerprint sensor 95, the fingerprint sensing values (e.g., indicated by the block 410 of FIG. 4) can be viewed as an image and the coordinates of a representative point of the fingerprint sensing values can be determined by the equation (1) in a similar manner. Hence, the coordinates of the representative point of the fingerprint sensing values obtained by using equation (1), denoted by Pf=(Xf, Yf), can be treated as a second position detected by the fingerprint sensor 95.

Accordingly, the position indicating a touch point, indicated by P=(X, Y), can be determined according to the first position (e.g., Pt=(Xt, Yt)) and the second position (e.g., Pf=(Xf, Yf)).

In some embodiments, the position indicating the touch point is a weighted averaged position of the first position and the second position. For example, the position indicating the touch point (e.g., P=(X, Y)) can be determined according to the following equation (2):

$$P=(X,Y)=((1-w)*Xt+w*Xf,(1-w)*Yt+w*Yf), \quad \text{Eq. (2)}$$

where w is a positive real value and 0<w≤1, provided that the fingerprint sensing resolution is equal to the touch sensing resolution. For example, if w is taken as 0.5, the position indicating the touch point can be determined based on the coordinates of (0.5*(Xt+Xf), 0.5*(Yt+Yf)) in accordance with the equation (2).

In addition, if the fingerprint sensing resolution is greater than the touch sensing resolution, the coordinates of the representative point of the fingerprint sensing values obtained by using equation (1), denoted by Pf=(Xf, Yf), or the second position, is required to be downscaled to the touch sensing domain.

Figure 8:
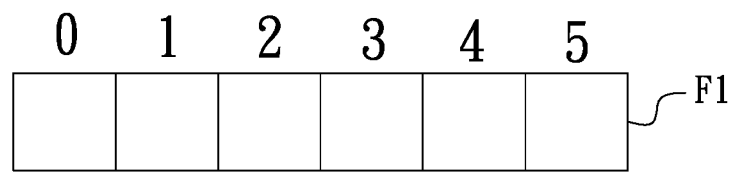
FIG. 8 is a schematic diagram illustrating conversion of the coordinates between the touch sensing data and the fingerprint sensing data.
Figure 8:
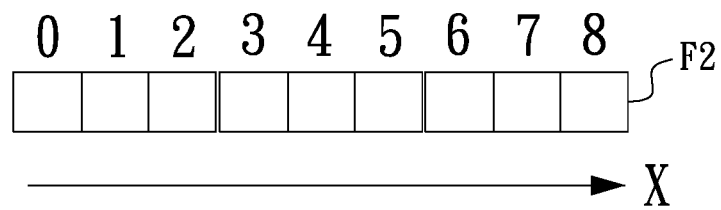

Referring to FIG. 8, conversion of the coordinates between the touch sensing data and the fingerprint sensing data is illustrated in schematic form according to an embodiment. As shown in FIG. 8, blocks T indicating 3 touch data nodes are illustrated under the touch sensing resolution. Blocks F1 indicating 6 fingerprint data nodes are illustrated under a first fingerprint sensing resolution which is two times greater than the touch sensing resolution in value; and blocks F2 indicating 8 fingerprint data nodes are illustrated under a second fingerprint sensing resolution which is three times greater than the touch sensing resolution in value. In accordance with relationships of the resolutions shown in FIG. 8 in the X-axis direction, x-coordinate in a fingerprint sensing domain, denoted by Xf, can be converted to or downscaled to x-coordinate in a touch sensing domain, denoted by Xfd, by the following equation (3):

$$Xfd=(Xf+0.5)/SL-0.5, \quad \text{Eq. (3)}$$

where SL denotes a ratio of the fingerprint sensing resolution to the touch sensing resolution in value. Further, the relationship for conversion or downscaling of y-coordinate in a fingerprint sensing domain to y-coordinate in a touch sensing domain can be derived in a similar manner. For brevity sake, the details will not be repeated. Certainly, the implementation of the invention is not limited to the above examples.

Thus, if the fingerprint sensing resolution is greater than the touch sensing resolution, the position indicating the touch point (e.g., P=(X, Y)) can be determined according to the first position (e.g., Pt=(Xt, Yt)) and the second position (e.g., Pf=(Xf, Yf)) which is downscaled to the touch sensing domain.

As such, in the above embodiments, the position of a touch point can be generated based on the touch sensing data and the fingerprint sensing data. The position of the touch point can be generated accurately with the contribution of the fingerprint sensing data. In a scenario of practical application for a computing device 1, such as smart phone, based on FIG. 1, a touch point by the user can be precisely determined based on the touch sensing data and the fingerprint sensing data, even though the signal-to-noise ratio (SNR) of touch sensing may reduce in a situation that the user does not hold the smart phone or the touch sensor 93 may be sensitive to noise.

For implementation of the above embodiments related to the method of FIG. 5 in the single chip 10 based on FIG. 1 or FIG. 2, the position indicating the touch point can be determined by the touch sensing module 11, such as the control unit 112, for example. The first position and second position can be determined by the touch sensing module 11 and fingerprint sensing module 12, respectively, for example. Alternatively, the first position, second position, position indicating the touch point can be determined by the touch sensing module 11, such as the control unit 112, for example.

In some scenarios, the user may perform multi-touch operations on the display panel 9 of the computing device 1. The following provides embodiments based on the method of FIG. 5 to enhance the touch sensing for multi-touch operations.

In some embodiments, the output touch data may include a plurality of positions indicating a plurality of touch points correspondingly. Examples regarding implementation of the embodiments are provided below, wherein the fingerprint sensing resolution is greater than the touch sensing resolution.

Figure 9:
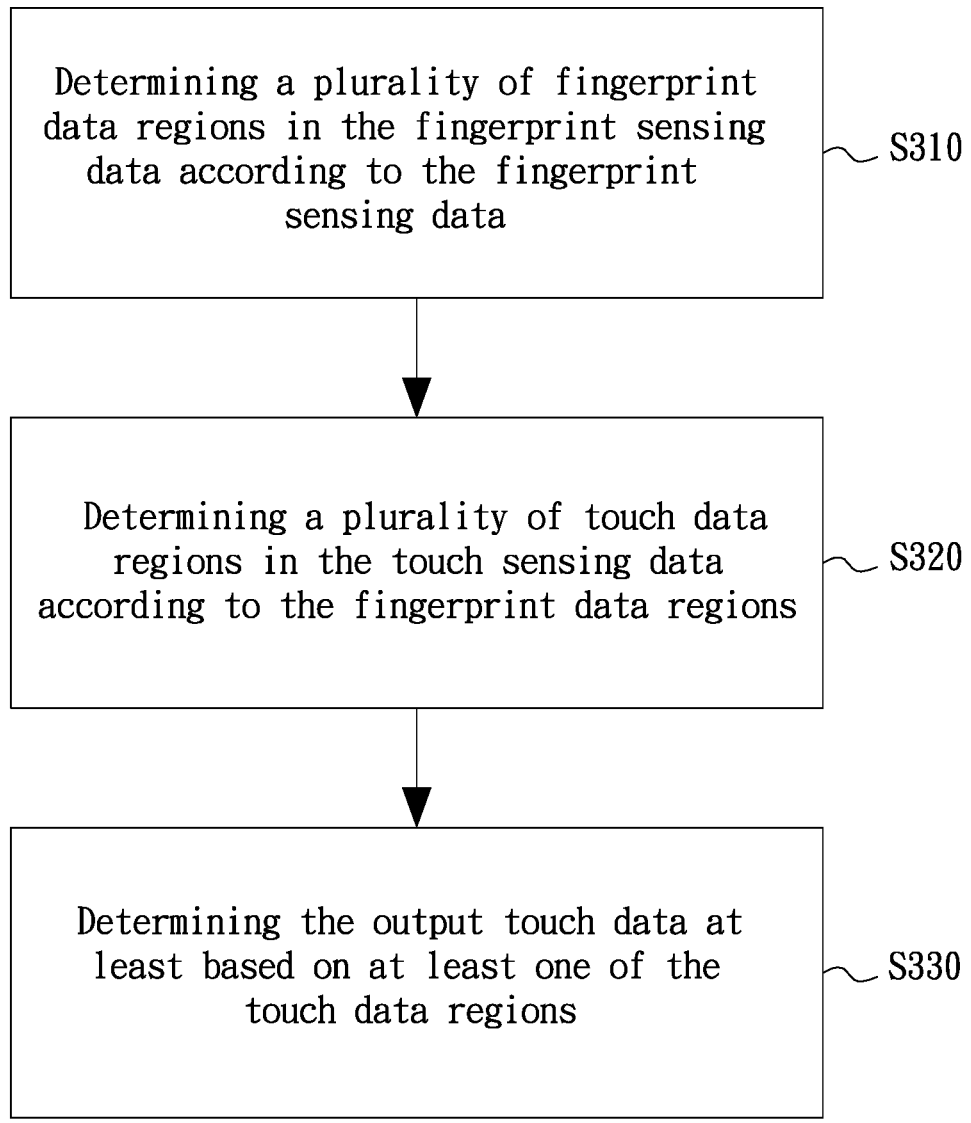
FIG. 9 is a flowchart illustrating an embodiment of step S30 of the method based on FIG. 5.

In an embodiment based on the method of FIG. 5, the step S30 can be implemented by a process including steps S310-S330, as shown in FIG. 9.

As indicated in step S310, a plurality of fingerprint data regions in the fingerprint sensing data are determined according to the fingerprint sensing data.

As indicated in step S320, a plurality of touch data regions in the touch sensing data are determined according to the fingerprint data regions.

As indicated in step S330, the output touch data is determined at least based on at least one of the touch data regions.

As such, the process as shown in FIG. 9 can be employed in a scenario of practical application for a computing device 1, such as smart phone, based on FIG. 1, multi-touch points by the user can be determined accurately based on the touch sensing data and the fingerprint sensing data, even though the multi-touch points may not be distinguished by using the touch sensing data.

Figure 10:
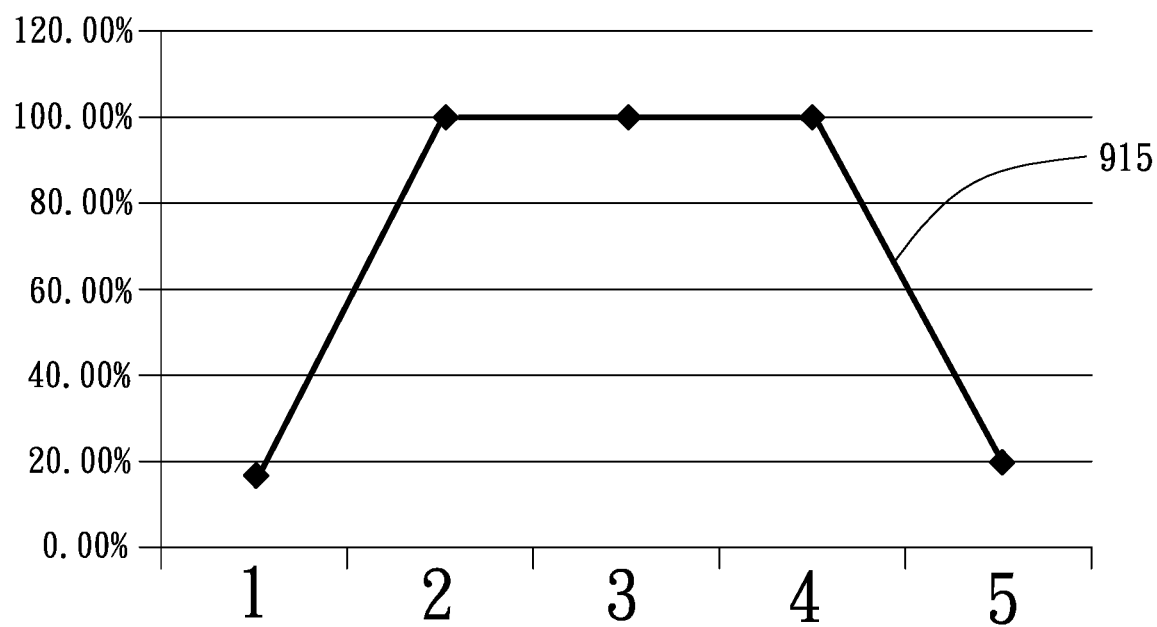
FIG. 10 is a schematic diagram illustrating an example of variation of touch sensing data.
Figure 11:
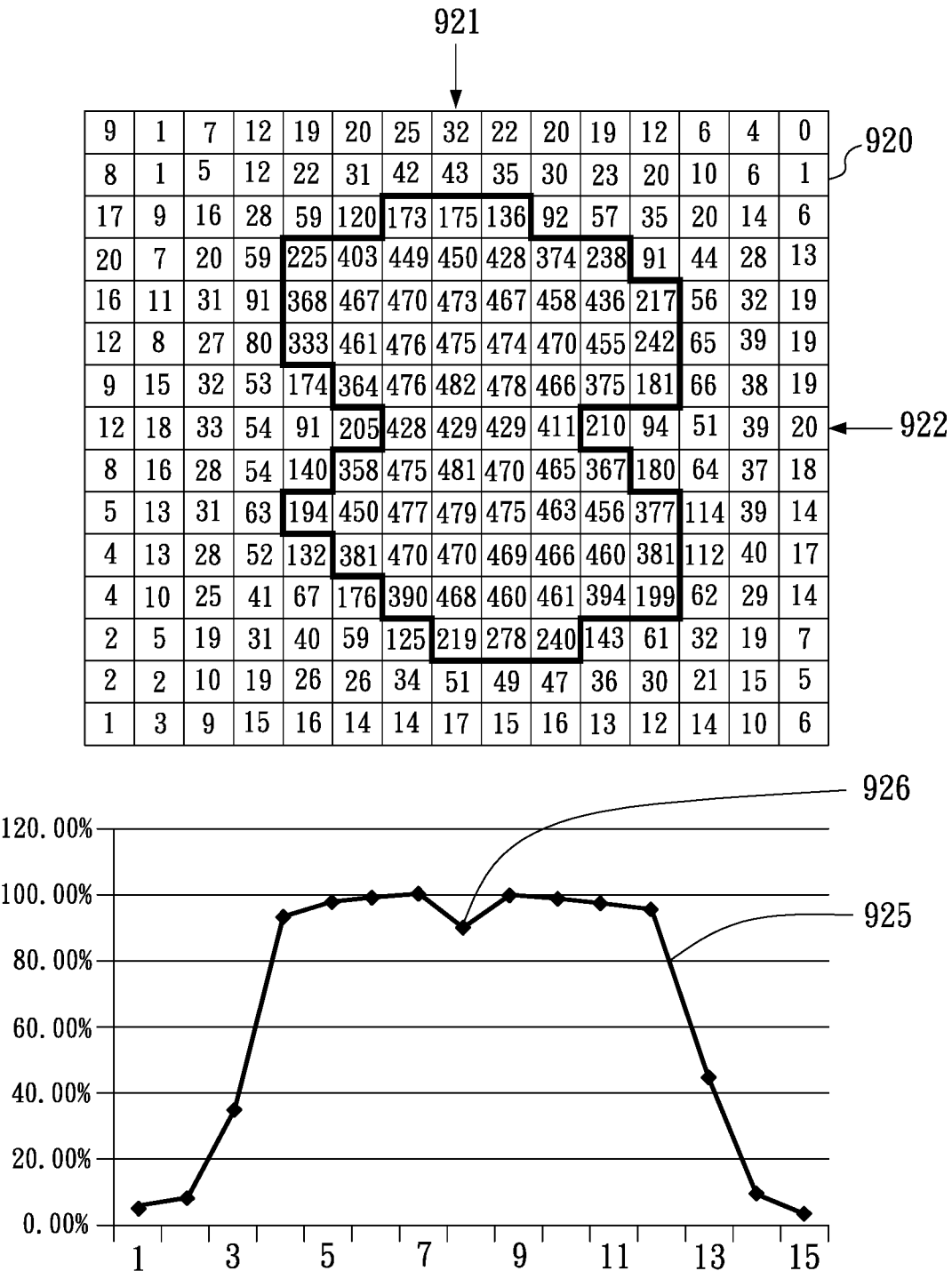
FIG. 11 is a schematic diagram illustrating an example of variation of fingerprint sensing data.

For the sake of illustration, it is supposed that two fingers of the user touches the display panel 9, and the single chip 10 produces internally the touch sensing data as indicated in FIG. 10 and the fingerprint sensing data as indicated in FIG. 11, for example, wherein the touch sensing data and fingerprint sensing data correspond to a same area on the screen area of the display panel 9. In FIG. 10, the touch sensing values of the touch sensing data, indicated by a block 910, do not indicate any data "valley" (e.g., a local minimum value occurs between two peak values) that can be used for data segmentation. As one can observe in FIG. 10, a curve 915 shows the touch sensing values taken along a middle column indicated by an arrow 911 and varies smoothly and maintains relative high values in the middle section of the curve 915. In this situation, the touch sensing data may not indicate the valley significantly due to touch sensing resolution, and hence one region for obtaining coordinates of one touch position may be obtained if data segmentation is performed on the touch sensing data only. As such, the touch sensing data seems to indicate the characteristic of a single touch and thus the computing device 1 may determine an incorrect touch event, not corresponding to the one that the user would expect.

By contrast, referring to FIG. 11, the fingerprint sensing values of the fingerprint sensing data, indicated by a block 920, indicate a data "valley" apparently that can be used for data segmentation. As one can observe in FIG. 11, a curve 925 shows the fingerprint sensing values taken along a middle column indicated by an arrow 921 and includes a data "valley," for example, a point 926, indicating a fingerprint sensing value of 429, between two peak values in the middle section of the curve 925. Hence, the fingerprint sensing data shows the characteristic of multi-touch more accurately. In the above scenario, fingerprint sensing data indicates the valley(s) more significantly due to the fingerprint sensing resolution higher than the touch sensing resolution, and two or more corresponding regions can be derived when data segmentation is performed on the fingerprint sensing data, resulting in two or more touch positions and/or corresponding touch information.

By implementing step S30 using the process in FIG. 9, the method of FIG. 5 can be further employed to facilitate the data segmentation of the touch sensing data, with the contribution of the fingerprint sensing data. In an example of step S310, a boundary row, indicated by an arrow 922, passing through the data valley (e.g., the point 926) can be determined and divides the fingerprint sensing data into two fingerprint data regions (e.g., an upper portion and a lower portion of the block 920). In an example of step S320, the touch sensing data (indicated by the block 910) can also be divided into two corresponding touch data regions (e.g., an upper portion and a lower portion of the block 910) by utilizing a boundary row, indicated by an arrow 912, that can be derived from the boundary row, indicated by the arrow 922. In step S330, the output touch data can then be determined at least based on at least one of the touch data regions; that is, at least based on one or more of the touch data regions, at least based on at least one of the touch data regions and at least one of the fingerprint data regions, or at least based on the touch data regions and fingerprint data regions. In this manner, the single chip 10 that implements the method based on FIGS. 5 and 9 can provide the output touch data associated with multi-touch operations more accurately.

In other words, one or more touch points (or touch positions) can be identified in various cases, even though the touch sensing data may merely indicate a single touch data region and a single touch point while the fingerprint sensing data may indicate a number of touch data regions. Thus, the synergy of using the touch sensing data and the fingerprint sensing data can facilitate more accurate results of determination of touch events.

In some embodiments, step S330 may include the step of determining a position at least based on one of the touch data regions, or at least based on one of the touch data regions and a corresponding one of the fingerprint data regions, wherein the output touch data includes the position. For example, for one or more of the touch data regions determined in step S320 (e.g., the upper portion and lower portion of the block 910 with respect to the boundary row indicated by an arrow 912 shown in FIG. 10), a position indicating a touch point in a corresponding one of the touch data regions can be determined based on the corresponding one of the touch data regions, or at least based on the corresponding one of the touch data regions and a corresponding one of the fingerprint data regions. For example, a respective position for each of the touch data regions can be determined, based on a corresponding one of the touch data regions, wherein the output touch data includes the respective position for each of the touch data regions. In the example shown in FIG. 11, two touch data regions including respective touch points can be determined accordingly. For implementation of the determination of the positions of the touch points, the above examples of determination of a representative point based on the equation (1), and/or (3) (as exemplified in FIG. 7 or 8) can be employed for each of the touch data regions. As such, the touch points of the user's multi-touch operation can be determined accurately and then multi-touch events can be determined more accurately. In some embodiments, the step S30 or S330 may be implemented additional or alternatively to provide the output touch data including one or more multi-touch parameters, such as distance between two touch points, size of the touch data region, and so on. For example, if any two touch points are determined (e.g., in the example shown in FIGS. 10 and 11), a distance (such as Euclidean distance, city block distance, or chessboard distance) between the positions of the two touch points can then be determined. In another example, when one of the touch data regions is determined, an area or size of that touch region can also be determined. Certainly, the implementation of the invention is not limited to the examples.

The following provides examples of data segmentation that may be employed in step S310 or S320. For example, a watershed algorithm for image segmentation may be employed to divide the fingerprint sensing data into a number of fingerprint data regions in accordance with the relations between any valley and peak found in the fingerprint sensing data. For example, a criterion, described in pseudo code shown in TABLE 1, may be taken in using an implementation of the watershed algorithm for step S310 or S320.

TABLE 1

| Criterion in pseudo code | Comments |
| --- | --- |
| IF ( valley / min(peak0, peak1) < threshold), <br>    THEN <br>    Label(peak0, peak1, 2); <br>    ELSE <br>    Label(peak0, peak1, 1); | If a valley divided by a minimum of peaks such as peak0 and peak1 is less than a threshold, the peaks are to be labeled by function Label( ) as in two regions; or else the peaks are to be labeled by function Label( ) as in a same region. |

Figure 12:
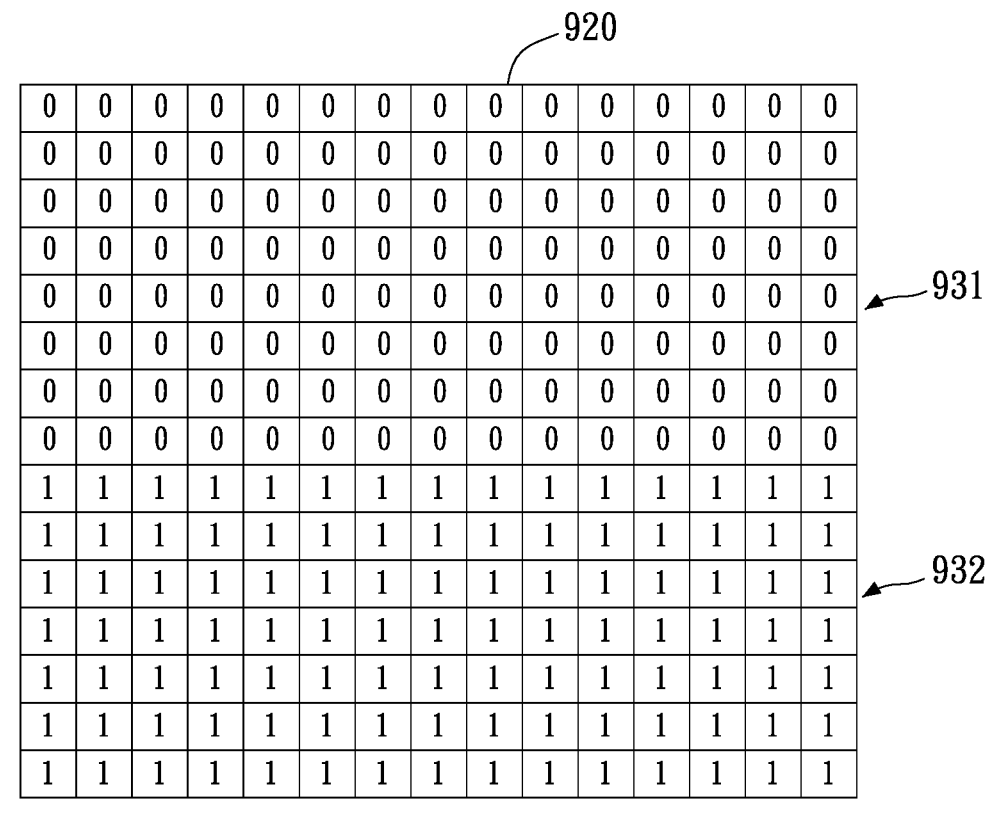

In the above example in TABLE 1, "peak0" and "peak1" indicate two local maximum values and "valley" is a local minimum value corresponding to a position located adjacent to those of the two local maximum values. If the threshold is set to 90% and the fingerprint sensing data exemplified in FIG. 11 is taken, then valley=429, peak0=482, peak1=481, valley/min(peak0, peak1)=429/481=89.2%<90%, leading to the criterion satisfied. In this case, it is determined that the fingerprint sensing data have the two peaks and can be labeled as having two regions, as illustrated in FIG. 12. In FIG. 12, the block 920 including a plurality of fingerprint data nodes is illustrated with a first portion 931 of the fingerprint data nodes labeled as 0 and a second portion 932 of the fingerprint data nodes labeled as 1. For implementation of the labeling, the function Label( ) may be configured to find one or more boundaries for partitioning of the fingerprint sensing data (e.g., the boundary row indicated by the arrow 922), and partition the fingerprint sensing data into the fingerprint data regions by assigning corresponding label values (e.g., 0, 1 and so on) to the fingerprint data nodes in the fingerprint sensing data, for example. Referring to FIG. 12, each fingerprint data node is then associated with at least a position (e.g., coordinates Index_X and Index_Y), a fingerprint sensing value, and a label. Certainly, the implementation of the invention is not limited to the examples.

Figure 13:
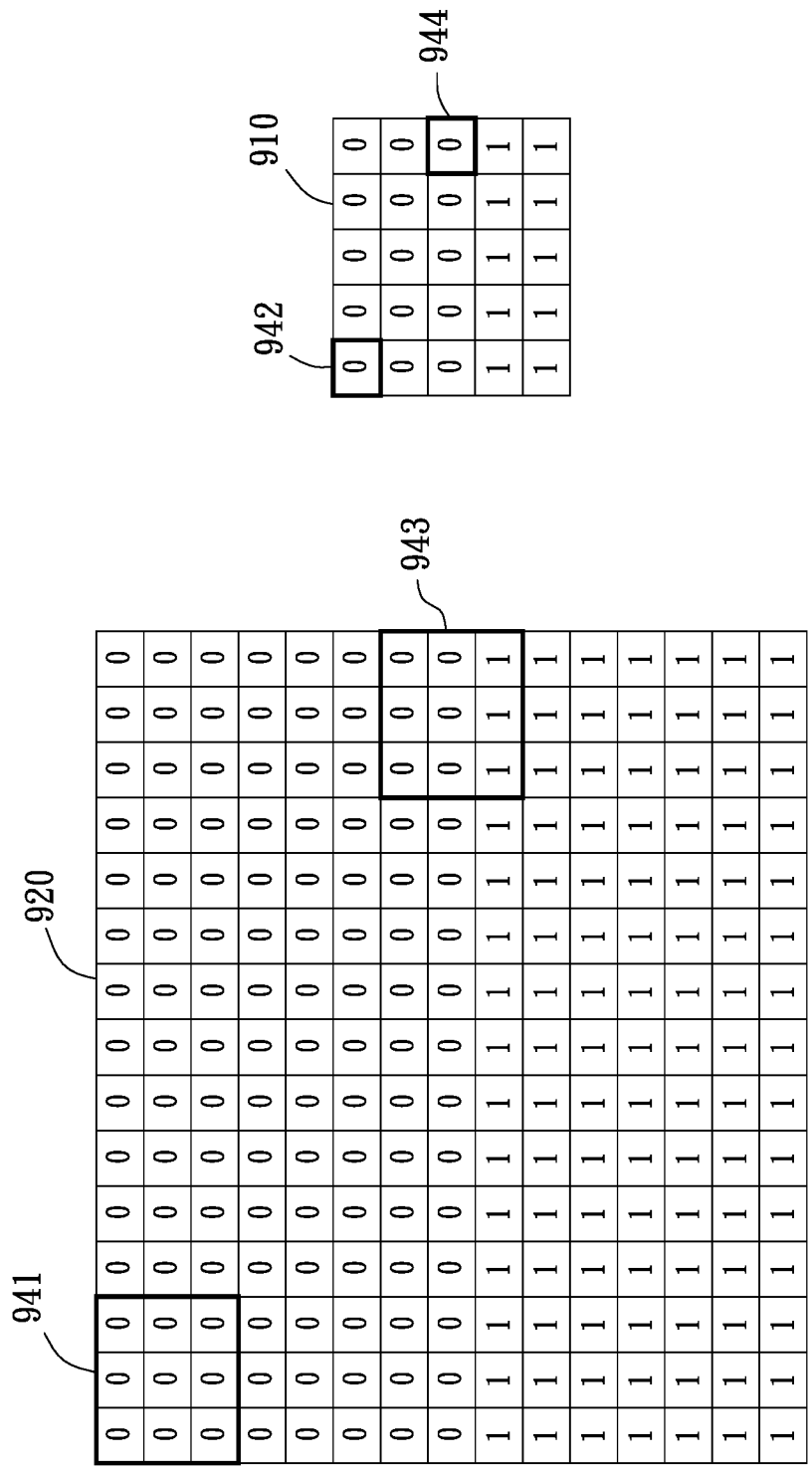
FIG. 13 is a schematic diagram illustrating an example of determination of touch data regions (on the right) in the touch sensing data based on the fingerprint data regions (on the left) determined as shown in FIG. 12.

In an embodiment of step S320, touch data regions in the touch sensing data can be determined based on the fingerprint data regions and the association between the touch data node and fingerprint data nodes. For example, referring to FIGS. 10 and 11, one touch data node of the touch sensing data indicated by the block 910 is associated with 3×3 fingerprint data nodes of the fingerprint sensing data indicated by the block 920. In this way, as illustrated in FIG. 13, each group of 3×3 fingerprint data nodes (e.g., those indicated by a block 941) is associated with one of touch data nodes and the one of touch data nodes (e.g., one indicated by a block 942) can be assigned a label according to the labels that the associated group of fingerprint data nodes have (e.g., 0).

In an embodiment, a representative label can be obtained by taking a specific position, such as a center, corner, and so on, of each group of fingerprint data nodes and assigned to the associated touch data node. This approach is efficient. To be more precise, in another embodiment, a representative label can be determined for each group of fingerprint data nodes by counting which label exists the most of the times. For example, the label 0 occurs in the group of fingerprint data nodes (e.g., those indicated by a block 941) for 9 times so that the representative label is the label 0 and the touch data node (e.g., one indicated by a block 942) can be assigned the label 0. In another example, the touch data node (e.g., one indicated by a block 944) can be assigned a label 0 because the label 0 occurs in the group of fingerprint data nodes (e.g., those indicated by a block 943) for 6 times and the label 1 occurs for 3 times. In another embodiment, if two labels occur the same times in the group of fingerprint data nodes, the associated touch data node can be assigned a representative label that is taken from the label of a center of the group of fingerprint data nodes. Certainly, the implementation of the invention is not limited to the above examples.

Figure 14:
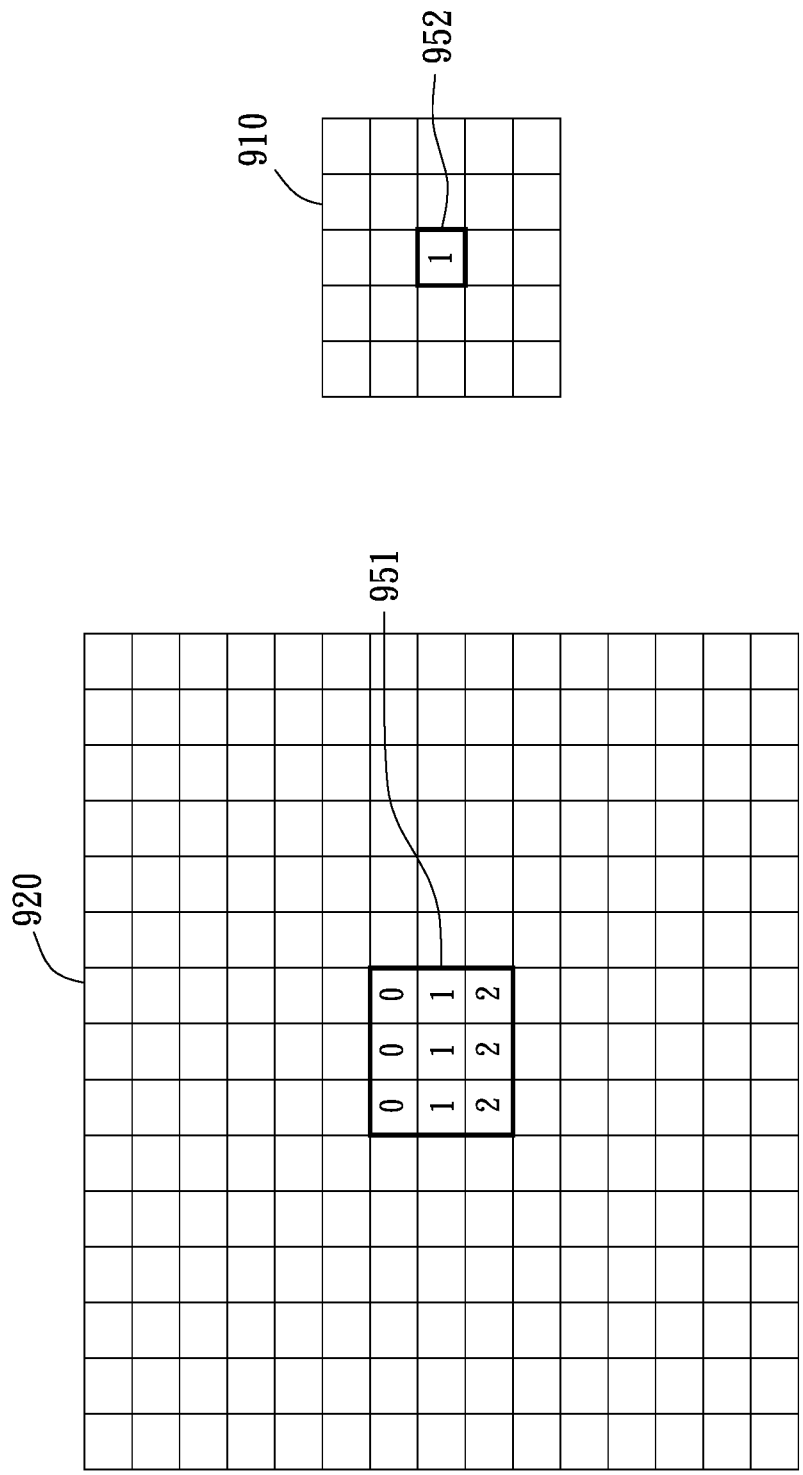
FIG. 14 is a schematic diagram illustrating another example of determination of touch data regions.

The above embodiments for determining the representative label for being assigned to the associated touch sensing node can be utilized when the number of fingerprint sensing regions is two, three or above. Referring to FIG. 14, it is supposed that the fingerprint sensing data, indicated by a block 920, in an example, is partitioned into three or more fingerprint data regions, which may be in arbitrary form. In an example, for the sake of illustration, it is supposed that three labels 0, 1, and 2 occur in a group of fingerprint data nodes (e.g., those indicated by a block 951). In this situation, a representative label can be obtained for each group of fingerprint data nodes by counting which label exists the most of the times. In an example, if the labels 0, 1, and 2 occur in the group of fingerprint data nodes (e.g., those indicated by the block 951) for the same number of times, the associated touch data node (e.g., one indicated by a block 952) can be assigned a representative label (e.g., 1) that is taken from the label of a center of the group of fingerprint data nodes (e.g., those indicated by the block 951). Certainly, the implementation of the invention is not limited to the above examples.

Figure 15:
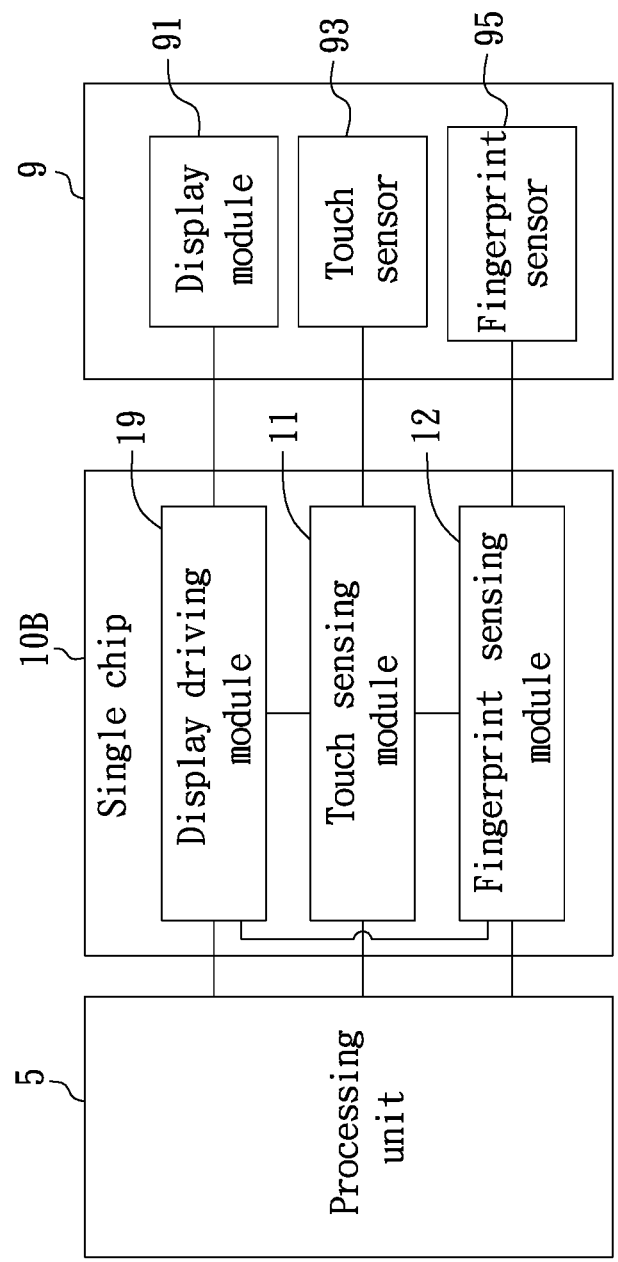
FIG. 15 is a block diagram illustrating a single chip capable of achieving touch sensing enhancement according to another embodiment of the invention, employed in a computing device.

Further, the single chip capable of achieving touch sensing enhancement as exemplified above can be integrated with a display driving module. Referring to FIG. 15, a single chip 10B capable of achieving touch sensing enhancement is illustrated according to another embodiment of the invention in block diagram form. As shown in FIG. 15, the single chip 10B can be based on FIG. 1 or 2 and further includes a display driving module 19, which is coupled to the touch sensing module 11 and the fingerprint sensing module 12 internally in the single chip 10B; and the display driving module 19 is utilized for being coupled to the display module 91 of the display panel 9 for driving the display module 91 to display images. In an embodiment for the display panel 9 with a fingerprint sensor 95 which is an optical fingerprint scanner, for example, when a touch event is detected by the touch sensing module 11, the touch sensing module 11 can inform the display driving module 19 of an area that the touch event occurs. In some implementations, the display driving module 19 may drive the display module 91 to emit light or an image pattern for exposure of the area. In the meantime, the touch sensing module 11 can inform the fingerprint sensing module 12 for activating the fingerprint sensing elements (e.g., optical sensing elements) corresponding to the area for fingerprint detection so as to obtain fingerprint sensing data. The fingerprint sensing data can be utilized internally in the single chip 10B in accordance with the method based on FIG. 5 as exemplified in one of the above embodiments. For the fingerprint sensor being other type such as capacitive fingerprint sensor, ultrasonic fingerprint sensor, the single chip 10B may be implemented to operate in a manner wherever appropriate. Certainly, the implementation of the invention is not limited to the above examples. It is also noted that different implementations may be made to integrate or separate the different modules as one or more circuits. For example, the display driving module and the touch sensing module can be integrated as a circuit, and the fingerprint sensing module can be implemented as another circuit which can be further totally or partially separated from or integrated with the circuit of the display driving module and the touch sensing module.

While the present disclosure has been described by means of specific embodiments, numerous modifications and variations could be made thereto by those skilled in the art without departing from the scope and spirit of the present disclosure set forth in the claims.

What is claimed is:

1. A method for touch sensing enhancement implemented in a single chip, wherein the single chip is used to be coupled to a display panel with a touch sensor and a fingerprint sensor, the method comprising:

obtaining touch sensing data by a touch sensing module disposed within the single chip and coupled to the touch sensor;

determining that the touch sensing data indicates a touch event according to a comparison between the touch sensing data and a threshold value, wherein the touch sensing data indicates touch sensing values associated with positions in a first area, and the first area corresponds to a reduced portion within a screen area of the display panel and the touch event occurs in the first area;

in response to the touch event, requesting fingerprint sensing data from a fingerprint sensing module disposed within the single chip and coupled to the fingerprint sensor, wherein the fingerprint sensor and the touch sensor are of full screen size and cover the screen area of the display panel, and the touch sensing module informs the fingerprint sensing module for activating a portion of the fingerprint sensor for fingerprint detection, the portion of the fingerprint sensor corresponding to the first area;

in response to the touch event, obtaining the fingerprint sensing data corresponding to the first area by the fingerprint sensing module disposed within the single chip and coupled to the fingerprint sensor; and in response to the touch event, generating, by the single chip, output touch data with respect to the touch event based on the touch sensing data and the fingerprint sensing data both corresponding to the first area for touch sensing enhancement with the display panel having both the touch sensor and the fingerprint sensor of full screen size.

2. The method according to claim 1, wherein the fingerprint sensing data is obtained when the display panel does not show any request for a fingerprint.

3. The method according to claim 2, wherein the fingerprint sensing data is obtained and used internally in the single chip for touch sensing enhancement, after user identification recognition is completed.

4. The method according to claim 1, further comprising:
determining that the touch sensing data indicates the touch event when the touch sensing data exceeds the threshold value.

5. The method according to claim 1, wherein the step of obtaining the fingerprint sensing data comprises converting the fingerprint sensing data from a first domain corresponding to a fingerprint sensing resolution to a second domain corresponding to a touch sensing resolution.

6. The method according to claim 1, wherein the step of obtaining the fingerprint sensing data comprises controlling the fingerprint sensor to have a fingerprint sensing resolution equal to a touch sensing resolution.

7. The method according to claim 1, wherein the output touch data includes a position indicating a touch point.

8. The method according to claim 7, wherein the position indicating the touch point is determined based on the touch sensing data and the fingerprint sensing data.

9. The method according to claim 8, wherein the touch sensing data includes a first position detected by the touch sensor, the fingerprint sensing data includes a second position detected by the fingerprint sensor, and the position indicating the touch point is determined according to the first position and the second position.

10. The method according to claim 9, wherein the position indicating the touch point is a weighted averaged position of the first position and the second position.

11. The method according to claim 1, wherein the output touch data includes a plurality of positions indicating a plurality of touch points correspondingly.

12. The method according to claim 1, wherein the step of generating output touch data based on the touch sensing data and the fingerprint sensing data includes:

determining a plurality of fingerprint data regions in the fingerprint sensing data according to the fingerprint sensing data;

determining a plurality of touch data regions in the touch sensing data according to the fingerprint data regions; and determining the output touch data at least based on at least one of the touch data regions.

13. The method according to claim 12, wherein the step of determining the output touch data includes:
determining a corresponding position for each one of the touch data regions based on the one of the touch data regions, wherein the output touch data includes the corresponding position for each one of the touch data regions.

14. A single chip capable of achieving touch sensing enhancement, wherein the single chip is used to be coupled to a display panel with a touch sensor and a fingerprint sensor, the single chip comprising:

a touch sensing circuit for being coupled to the touch sensor and obtaining touch sensing data;

a fingerprint sensing module for being coupled to the touch sensor and obtaining fingerprint sensing data; and a control unit, coupled to the touch sensing circuit and the fingerprint sensing module, for generating output touch data based on the touch sensing data and the fingerprint sensing data, wherein the control unit determines that the touch sensing data indicates a touch event according to a comparison between the touch sensing data and a threshold value, wherein the touch sensing data indicates touch sensing values associated with positions in a first area, and the first area corresponds to a reduced portion within a screen area of the display panel and the touch event occurs in the first area;

wherein the fingerprint sensor and the touch sensor are of full screen size and cover the screen area of the display panel, in response to the touch event, the control unit informs the fingerprint sensing module for activating a portion of the fingerprint sensor for fingerprint detection, the portion of the fingerprint sensor corresponding to the first area, in response to the touch event, the fingerprint sensing module obtains the fingerprint sensing data corresponding to the first area, and in response to the touch event, the control unit generates the output touch data with respect to the touch event based on the touch sensing data and the fingerprint sensing data both corresponding to the first area for touch sensing enhancement with the display panel having both the touch sensor and the fingerprint sensor of full screen size.

15. The single chip according to claim 14, wherein the fingerprint sensing data is obtained when a display panel does not show any request for a fingerprint.

16. The single chip according to claim 15, wherein the fingerprint sensing data is obtained and used internally in the single chip for touch sensing enhancement, after user identification recognition is completed.

17. The single chip according to claim 14, wherein the control unit is configured to determine that the touch sensing data indicates the touch event when the touch sensing data exceeds the threshold value.

18. The single chip according to claim 14, wherein the fingerprint sensing data is converted from a first domain corresponding to a fingerprint sensing resolution to a second domain corresponding to a touch sensing resolution.

19. The single chip according to claim 14, wherein the control unit is configured to control the fingerprint sensor to have a fingerprint sensing resolution equal to a touch sensing resolution.

20. The single chip according to claim 14, wherein the output touch data includes a position indicating a touch point.

21. The single chip according to claim 20, wherein the control unit is configured to determine the position based on the touch sensing data and the fingerprint sensing data.

22. The single chip according to claim 21, wherein the touch sensing data includes a first position detected by the touch sensor, the fingerprint sensing data includes a second position detected by the fingerprint sensor, and the position indicating the touch point is determined according to the first position and the second position.

23. The single chip according to claim 22, wherein the position indicating the touch point is a weighted averaged position of the first position and the second position.

24. The single chip according to claim 14, wherein the output touch data includes a plurality of positions indicating a plurality of touch points correspondingly.

25. The single chip according to claim 14, wherein the control unit is configured to determine a plurality of touch data regions in the touch sensing data according to the fingerprint sensing data, and determines the output touch data at least based on the touch data regions.

26. The single chip according to claim 25, wherein the control unit is configured to determine a position at least based on a corresponding one of the touch data regions, wherein the output touch data includes the position.

27. The single chip according to claim 14, wherein the control unit is configured to determine a plurality of fingerprint data regions in the fingerprint sensing data according to the fingerprint sensing data; the control unit is configured to determine a plurality of touch data regions in the touch sensing data according to the fingerprint data regions; and the control unit is configured to determine the output touch data at least based on the touch data regions.

28. The single chip according to claim 27, wherein the control unit is configured to determine a corresponding position for each one of the touch data regions at least based on the one of the touch data regions, wherein the output touch data includes the corresponding position for each one of the touch data regions.

29. A touch sensing method for a display with a touch sensor and a fingerprint sensor, comprising:
    obtaining touch sensing data from the touch sensor;
    determining whether a touch event occurs according to the touch sensing data;
    defining a first area according to the touch sensing data when the touch event occurs;
    obtaining fingerprint sensing data from the fingerprint sensor according to the first area;
    defining a second area corresponding to the touch event according to the fingerprint sensing data, wherein the second area is smaller than the first area; and
    generating output touch data with respect to the touch event at least based on the fingerprint sensing data corresponding to the second area, wherein the touch sensor and the fingerprint sensor of the display panel are both of full screen size.

30. The touch sensing method according to claim 29, wherein the output touch data with respect to the touch event is generated at least based on the fingerprint sensing data corresponding to the second area and the touch sensing data corresponding to the first area.

31. The touch sensing method according to claim 29, wherein the fingerprint sensing data is obtained for touch sensing only.

32. The touch sensing method according to claim 29, wherein the step of defining the second area further comprises:
    converting the fingerprint sensing data from a first domain corresponding to a fingerprint sensing resolution to a second domain corresponding to a touch sensing resolution; and
    defining the second area according to the fingerprint sensing data in the second domain.

* * * * *